Patented Dec. 4, 1951

2,576,970

UNITED STATES PATENT OFFICE 2,576,970

3-(METHYLPYRROLIDYL-1)PROPYL PARA-(DELTA 2) - CYCLOHEXENYLOXYBENZOATES AND SALTS THEREOF

William Bradley Reid, Jr., Kalamazoo, Mich., assignor to The Upjohn Company, Kalamazoo, Mich., a corporation of Michigan No Drawing. Application July 12, 1950,
Serial No. 173,480

3 Claims. (Cl. 260—326.3)

This invention relates to new compositions of matter which are of therapeutic value. Specifically, the invention relates to basic esters, 3-(methylpyrrolidyl-1)propyl para-(delta 2)-cyclohexenyloxybenzoates, represented by the following formula:

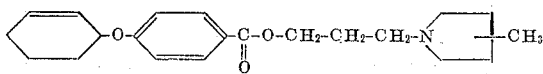

and acid addition salts thereof. These products, particularly the water-soluble acid addition salts, are useful as local anesthetics. They possess a high degree of surface activity, a favorable therapeutic index, and are comparatively non-irritating in effective doses. Their action is rapid in onset and of long duration. In addition to being surface-active local anesthetics they also possess infiltration activity. Of these esters, the 2-methylpyrrolidyl compounds are preferred for their high activity.

The free basic esters of this invention are colorless, viscous liquids which are readily soluble in common organic solvents, but insoluble in water. Because of their basic nitrogen atom, they react with most of the common acids to form water-soluble acid addition salts. They react with hydrogen chloride to form crystalline water-soluble hydrochlorides which, because of their water solubility, are more conveniently employed than the free base.

The 3-(methylpyrrolidyl-1)propyl para-(delta 2)-cyclohexenyloxybenzoates of this invention can be prepared by condensing the hitherto unknown para-(delta 2)-cyclohexenyloxybenzoic acid with a 3-(methylpyrrolidyl-1)propyl chloride hydrochloride in methyl ethyl ketone solution in the presence of anhydrous potassium carbonate. Other methods which are known for the preparation of esters can also be employed. The product can be isolated as the free basic ester or it can be converted to a water-soluble acid addition salt, which is generally more convenient to use, by treatment according to conventional procedure with an appropriate acid, such as hydrochloric, hydrobromic, citric, tartaric, and the like.

The following specific examples will illustrate in greater detail the practice of the invention, but are given by way of illustration only and are not to be construed as limiting.

*Preparation 1.—Ethyl para-(delta 2)-cyclohexenyloxybenzoate*

To a mixture of 49.8 grams of ethyl para-hydroxybenzoate and 41.4 grams of anhydrous potassium carbonate in 150 milliliters of pure anhydrous acetone at the boiling point was added 48.3 grams of (delta 2)-cyclohexenyl bromide during a period of one hour. The mixture was heated under reflux for seven hours, cooled, and filtered to remove inorganic salts. The salts were washed with acetone, the filtrate and washings combined, and the acetone removed. The residual oil was dissolved in ether and the ethereal solution washed with ten percent sodium carbonate solution and dried. After removal of the ether, distillation of the residue under reduced pressure gave 51 grams (68.8 percent) of ethyl para-(delta 2)-cyclohexenyloxybenzoate, boiling at 168–172 degrees centigrade at 1.4 millimeters of mercury; $n_D^{25} = 1.5459$.

Analysis:
Calculated for $C_{15}H_{18}O_3$ _____ C 73.03; H 7.30
Found _____ C 72.98; H 7.21.

*Preparation 2.—Para-(delta 2)-cyclohexenyloxybenzoic acid*

A solution of 24.6 grams of ethyl para-(delta 2)-cyclohexenyloxybenzoate and 11.2 grams of potassium hydroxide in alcohol was heated under reflux for three hours, diluted with about eight volumes of water, and acidified with concentrated hydrochloric acid. The para-(delta 2)-cyclohexenyloxybenzoic acid which precipitated was recrystallized from dry benzene, from which it separated as white plates which melted at 177 degrees centigrade. The yield was 15.1 grams (69.3 percent).

Analysis:
Calculated for $C_{13}H_{14}O_3$ _____ C 71.5; H 6.43
Found _____ C 70.8; H 6.41

*Preparation 3.—3-(methylpyrrolidyl-1)propyl chloride hydrochloride*

A solution of 14.3 grams of 3-(2-methylpyrrolidyl-1)-propanol-1 [Moffett, J. Org. Chem. 14, 862 (1949)] in 75 milliliters of chloroform was treated dropwise at room temperature with a solution of 18.6 grams of 96 percent thionyl chloride in fifty milliliters of chloroform. After heating the mixture under reflux for three hours, the chloroform was removed, water was added, and the aqueous solution made alkaline by the addition of potassium hydroxide solution. The alkaline mixture was extracted with ether and the extract dried. Addition of ethereal hydrogen chloride to the dried extract precipitated 3-(2-methylpyrrolidyl-1)propyl chloride hydrochloride as a white solid. Recrystallization of the solid from isopropanol-ether gave 10.2 grams (51.4 percent) of 3-(2-methylpyrrolidyl-1)propyl chloride hydrochloride as white plates, which melted at 150.5–152 degrees centigrade.

Analysis:
Calculated for $C_8H_{17}NCl_2$__ Cl (Volhard), 17.85
Found _____ Cl (Volhard), 18.17

The 3-(3-methylpyrrolidyl-1)propyl chloride hydrochloride is prepared in the same manner, starting from 3-(3-methylpyrrolidyl-1)-propanol-1, which is prepared in the same manner as its isomer.

EXAMPLE.—*3-(2 - methylpyrrolidyl - 1) propyl para-(delta 2)-cyclohexenyloxybenzoate hydrochloride*

A mixture of 5.45 grams of para-(delta 2)-cyclohexenyloxybenzoic acid, five grams of 3-(2-methylpyrrolidyl-1)-propyl chloride hydrochloride, and 7.6 grams of anhydrous potassium carbonate in fifty milliliters of pure methyl ethyl ketone was heated under reflux for twenty-four hours. Solid material was removed by filtration and methyl ethyl ketone was removed by distillation. The residual oil was dissolved in ether and extracted with dilute aqueous alkali and with dilute aqueous acid. The aqueous acidic extract was made alkaline and extracted with ether, and the ethereal extract was dried over anhydrous potassium carbonate. Anhydrous hydrogen chloride was introduced into the dried ether solution and the hydrochloride of the basic ester separated as a white solid. Recrystallization of the solid from methyl ethyl ketone-ethanol gave 6.43 grams (68 percent) of 3-(2-methylpyrrolidyl-1)propyl para-(delta 2)-cyclohexenyloxybenzoate hydrochloride, which melted at 132–133 degrees centigrade.

Analysis:
Calculated for $C_{21}H_{30}O_3NCl$ _____Cl 9.36
Found _____ Cl 9.41

The 3-(3 - methylpyrrolidyl - 1)propyl para-(delta 2)-cyclohexenyloxybenzoate hydrochloride is prepared in the same manner, starting with 3-(3-methylpyrrolidyl-1)propyl chloride hydrochloride.

Other acid salts of the foregoing esters may be prepared by procedures known in the art, as for example, isolation of the free base and conversion to the desired acid salt by reaction with a stoichiometric quantity of the selected acid. Acid salts preparable in such manner include the hydrochloride, hydrobromide, sulfate, nitrate, acetate, citrate, tartarate, picrate, and the like.

Although the foregoing specification comprises preferred embodiments of the invention, it is to be understood that the invention is not limited to the exact details shown and described, and that variations and modifications may be made without departing from the scope of the invention as defined in the appended claims.

I claim:
1. A compound selected from the group consisting of 3 - (methylpyrrolidyl - 1)propyl para-(delta 2)-cyclohexenyloxybenzoates, having the following formula:

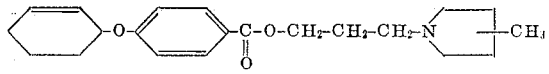

and acid addition salts thereof.

2. 3-(2-methylpyrrolidyl-1)propyl para-(delta 2)-cyclohexenyloxybenzoate.

3. 3-(2-methylpyrrolidyl-1)propyl para-(delta 2)-cyclohexenyloxybenzoate hydrochloride.

WILLIAM BRADLEY REID, Jr.

No references cited.